(12) United States Patent
Chen

(10) Patent No.: US 8,002,302 B1  
(45) Date of Patent: Aug. 23, 2011

(54) BICYCLE KICKSTAND HAVING QUICK RELEASE FUNCTION

(75) Inventor: Ching-Shu Chen, Changhua (TW)

(73) Assignee: Chosen Co., Ltd., Changhua Hsien (TW)

( * ) Notice: Subject to any disclaimer, the term of this patent is extended or adjusted under 35 U.S.C. 154(b) by 590 days.

(21) Appl. No.: 12/106,507

(22) Filed: Apr. 21, 2008

(51) Int. Cl.
*B62H 1/02* (2006.01)

(52) U.S. Cl. .................. 280/298; 280/293; 280/297

(58) Field of Classification Search .............. 280/293, 280/295, 297, 298; 135/74
See application file for complete search history.

(56) References Cited

U.S. PATENT DOCUMENTS

| | | | | |
|---|---|---|---|---|
| 456,347 A * | 7/1891 | Taylor | ............................ | 280/298 |
| 563,927 A * | 7/1896 | Holmes | ............................ | 280/296 |
| 591,820 A * | 10/1897 | Cronback | ............................ | 280/298 |
| 812,547 A * | 2/1906 | Cook | ............................ | 280/298 |
| 2,409,452 A * | 10/1946 | Stone | ............................ | 403/99 |
| 3,712,640 A * | 1/1973 | Shipman et al. | ............................ | 280/301 |
| RE28,067 E * | 7/1974 | Hyman | ............................ | 135/74 |
| 4,494,764 A * | 1/1985 | Kelley | ............................ | 280/293 |
| 5,372,375 A * | 12/1994 | Mahoney | ............................ | 280/304 |
| 5,607,173 A * | 3/1997 | Lai | ............................ | 280/293 |
| 6,170,846 B1 * | 1/2001 | Holter | ............................ | 280/293 |
| 6,237,929 B1 * | 5/2001 | Kielland | ............................ | 280/294 |
| 6,454,363 B1 * | 9/2002 | Vignocchi et al. | ............................ | 301/124.2 |
| 7,188,854 B1 * | 3/2007 | Pickens | ............................ | 280/293 |
| 2003/0218311 A1 * | 11/2003 | Eberhardt et al. | ............................ | 280/293 |
| 2006/0076752 A1 * | 4/2006 | Montague et al. | ............................ | 280/279 |
| 2006/0099027 A1 * | 5/2006 | Liao | ............................ | 403/322.4 |
| 2006/0157625 A1 * | 7/2006 | Griggs | ............................ | 248/188.8 |
| 2006/0191764 A1 * | 8/2006 | Kanehisa et al. | ............................ | 192/64 |
| 2008/0041432 A1 * | 2/2008 | Willis | ............................ | 135/74 |

* cited by examiner

*Primary Examiner* — Kevin Hurley  
*Assistant Examiner* — Maurice Williams  
(74) *Attorney, Agent, or Firm* — Alan Kamrath; Kamrath & Associates PA

(57) ABSTRACT

A kickstand for a bicycle includes a support stand, a connector detachably mounted on an upper portion of the support stand, and a quick release device releasably mounted on the connector. The quick release device is releasably locked onto a rear wheel axle of the bicycle to attach the support stand to the rear wheel axle. Thus, the kickstand is mounted on and detached from the rear wheel axle of the bicycle easily and quickly by locking and unlocking the quick release device, thereby facilitating a user mounting and detaching the kickstand.

18 Claims, 8 Drawing Sheets

BICYCLE KICKSTAND HAVING QUICK RELEASE FUNCTION

BACKGROUND OF THE INVENTION

1. Field of the Invention

The present invention relates to a kickstand and, more particularly, to a kickstand for a bicycle.

2. Description of the Related Art

Figure 10:
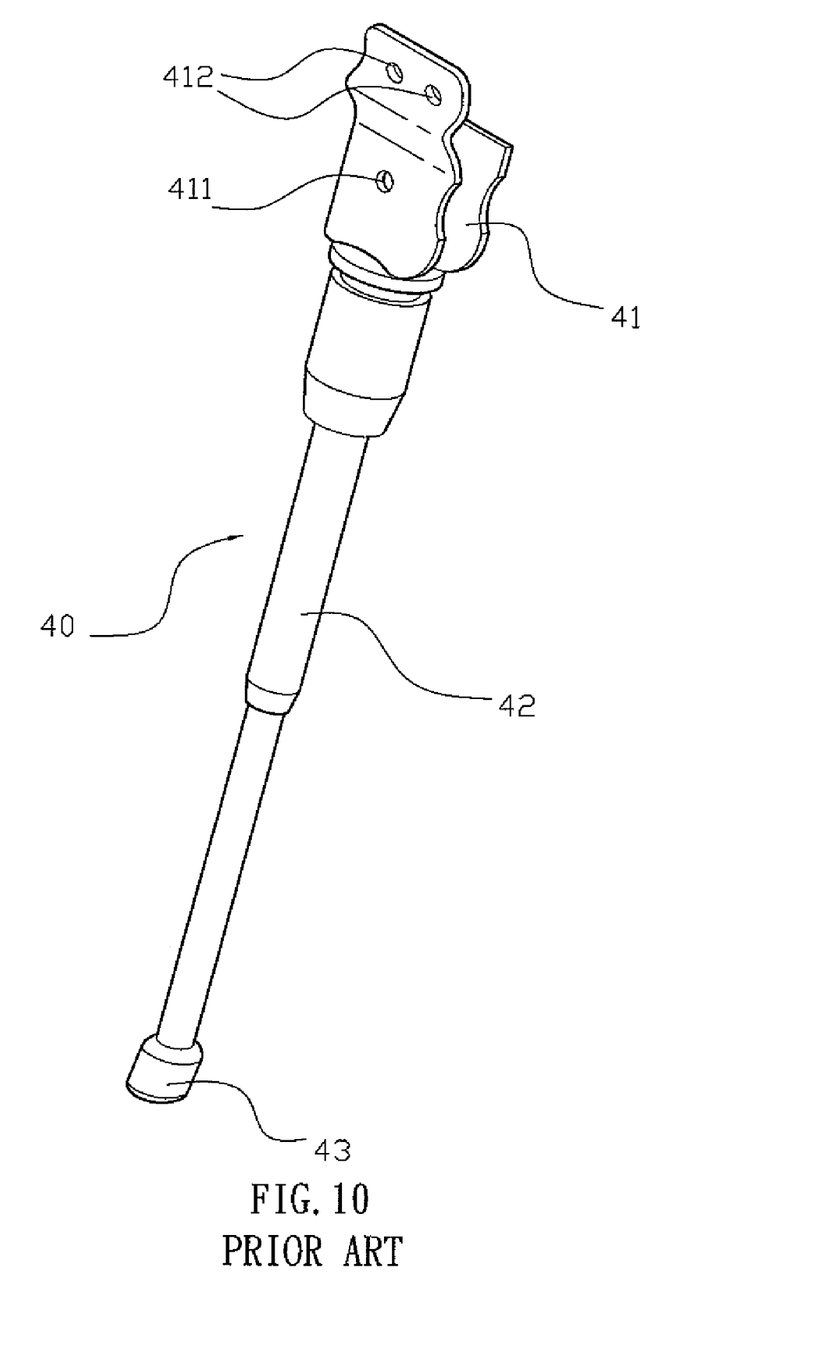
FIG. 10 is a perspective view of a conventional kickstand for a bicycle in accordance with the prior art.

A conventional kickstand 40 for a bicycle in accordance with the prior art shown in FIG. 10 comprises a support leg 42, a mounting bracket 41 mounted on the upper end of the support leg 42 and a support pad 43 mounted on the lower end of the support leg 42. The mounting bracket 41 is provided with a connecting hole 411 and two positioning holes 412. In assembly, when the mounting bracket 41 is mounted on the chain stay of the bicycle, the connecting hole 411 is attached to the chain stay of the bicycle by a locking bolt and a locking nut to lock the mounting bracket 41 onto the chain stay of the bicycle.

However, the kickstand 40 is locked onto the chain stay of the bicycle by the locking bolt and the locking nut, so that the kickstand 40 cannot mounted on and detached from the chain stay of the bicycle easily and quickly. In addition, the kickstand 40 has a determined weight, thereby increasing the whole weight of the bicycle. Further, the support leg 42 of the kickstand 40 protrudes outwardly from the bicycle, thereby greatly causing inconvenience and danger to a rider when riding on the bicycle to proceed an acrobatic performance. Further, the chain stay of the bicycle is made of a composite material, so that when the mounting bracket 41 clamps the chain stay of the bicycle, the chain stay of the bicycle is easily deformed or worn out due to the clamping force.

BRIEF SUMMARY OF THE INVENTION

In accordance with the present invention, there is provided a kickstand for a bicycle, comprising a support stand, a connector detachably mounted on an upper portion of the support stand, and a quick release device releasably mounted on the connector.

The primary objective of the present invention is to provide a bicycle kickstand having quick release function.

Another objective of the present invention is to provide a kickstand for a bicycle, wherein the kickstand is mounted on and detached from the rear wheel axle of the bicycle easily and quickly by locking and unlocking the quick release device, thereby facilitating a user mounting and detaching the kickstand.

A further objective of the present invention is to provide a kickstand for a bicycle, wherein the limit block of the connector is inserted into and locked in the opening of the chain stay of the bicycle so that the kickstand is locked on the chain stay exactly and stably.

A further objective of the present invention is to provide a kickstand for a bicycle, wherein when the upper leg and the lower leg of the support stand are detached from the middle leg of the support stand, the upper leg and the lower leg are received in the two receiving slots of the receiving member so that the upper leg and the lower leg are juxtaposed to the middle leg, and the support stand is foldable when not in use so as to reduce the whole volume of the bicycle.

A further objective of the present invention is to provide a kickstand for a bicycle, wherein the support stand is detachable from the connector when not in use so as to reduce the whole weight of the bicycle and to prevent the support stand from protruding outwardly from the bicycle.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-4, a kickstand for a bicycle in accordance with the preferred embodiment of the present invention comprises a support stand 30, a connector 20 detachably mounted on an upper portion of the support stand 30, and a quick release device 10 releasably mounted on the connector 20.

The quick release device 10 includes a shaft 11 extending through the connector 20, a control handle 12 pivotally mounted on a first end of the shaft 11, a fixing member 14 detachably mounted on a second end of the shaft 11, a locking member 13 mounted on the shaft 11 and located between the connector 20 and the control handle 12, and two elastic members 141 mounted on the shaft 11 and located between the connector 20 and the fixing member 14.

The shaft 11 of the quick release device 10 is movably mounted on the connector 20. The first end of the shaft 11 is provided with a support rod 112. The second end of the shaft 11 is provided with an outer threaded section 111.

The locking member 13 of the quick release device 10 is movably mounted on the shaft 11 and has a side provided with an abutting face 131 facing and abutting the control handle 12.

The control handle 12 of the quick release device 10 has an end provided with an enlarged pivot portion 120 mounted on the support rod 112 of the shaft 11 pivotally and eccentrically. The pivot portion 120 of the control handle 12 abuts the abutting face 131 of the locking member 13 and is provided with an eccentric pivot hole 121 pivotally mounted on the support rod 112 of the shaft 11 by riveting. The pivot portion 120 of the control handle 12 has a periphery provided with slit 122 to allow passage of the first end of the shaft 11 during rotation of the control handle 12 relative to the support rod 112 of the shaft 11. Thus, the pivot portion 120 of the control handle 12 is rotatable relative to the support rod 112 of the shaft 11 eccentrically to push the locking member 13 toward the connector 20.

The fixing member 14 of the quick release device 10 is provided with a screw bore 142 screwed onto the outer threaded section 111 of the shaft 11.

The connector 20 is located between the control handle 12 and the fixing member 14 of the quick release device 10. The connector 20 has an upper portion provided with a shaft hole 21 to allow passage of the shaft 11 of the quick release device 10 and a lower portion provided with a mounting hole 23 mounted on the upper portion of the support stand 30. The connector 20 has a first side facing the control handle 12 of the quick release device 10 and a second side provided with a protruding limit block 22 facing the fixing member 14 of the quick release device 10.

The support stand 30 includes an upper leg 31 having an upper end detachably mounted on the connector 20, a middle leg 33 having an upper end detachably mounted on a lower end of the upper leg 31, a lower leg 32 having an upper end detachably mounted on a lower end of the middle leg 33, a height adjusting member 323 mounted on a lower end of the lower leg 32, a receiving member 34 mounted on the middle leg 33, and an elastic cord 331 mounted in the middle leg 33 and having a first end 332 secured to the lower end of the upper leg 31 and a second end 333 secured to the upper end of the lower leg 32.

The upper leg 31 of the support stand 30 is a hollow tube. The upper end of the upper leg 31 is provided with a reduced mounting post 311 inserted into and detachably mounted in the mounting hole 23 of the connector 20. The lower end of the upper leg 31 is provided with a reduced mounting post 312 inserted into and detachably mounted in the upper end of the middle leg 33.

The lower leg 32 of the support stand 30 is a hollow tube. The upper end of the lower leg 32 is provided with a reduced mounting post 321 inserted into and detachably mounted in the lower end of the middle leg 33. The lower end of the lower leg 32 is provided with an inner threaded section 322. The height adjusting member 323 of the support stand 30 is a bolt that is screwed into the inner threaded section 322 of the lower leg 32. Thus, the height adjusting member 323 is rotatable and movable relative to the lower leg 32 to adjust the whole length of the support stand 30.

The receiving member 34 of the support stand 30 is a ring-shaped body that is mounted on a middle portion of the middle leg 33. The receiving member 34 of the support stand 30 is provided with a mounting hole 341 mounted on the middle leg 33. The receiving member 34 of the support stand 30 has a periphery provided with two radially opposite receiving slots 342 to receive the upper leg 31 and the lower leg 32 when the upper leg 31 and the lower leg 32 are detachable from the middle leg 33. Each of the two receiving slots 342 of the receiving member 34 is substantially arc-shaped.

The middle leg 33 of the support stand 30 is a hollow tube and is located between the two receiving slots 342 of the receiving member 34.

Figure 1:
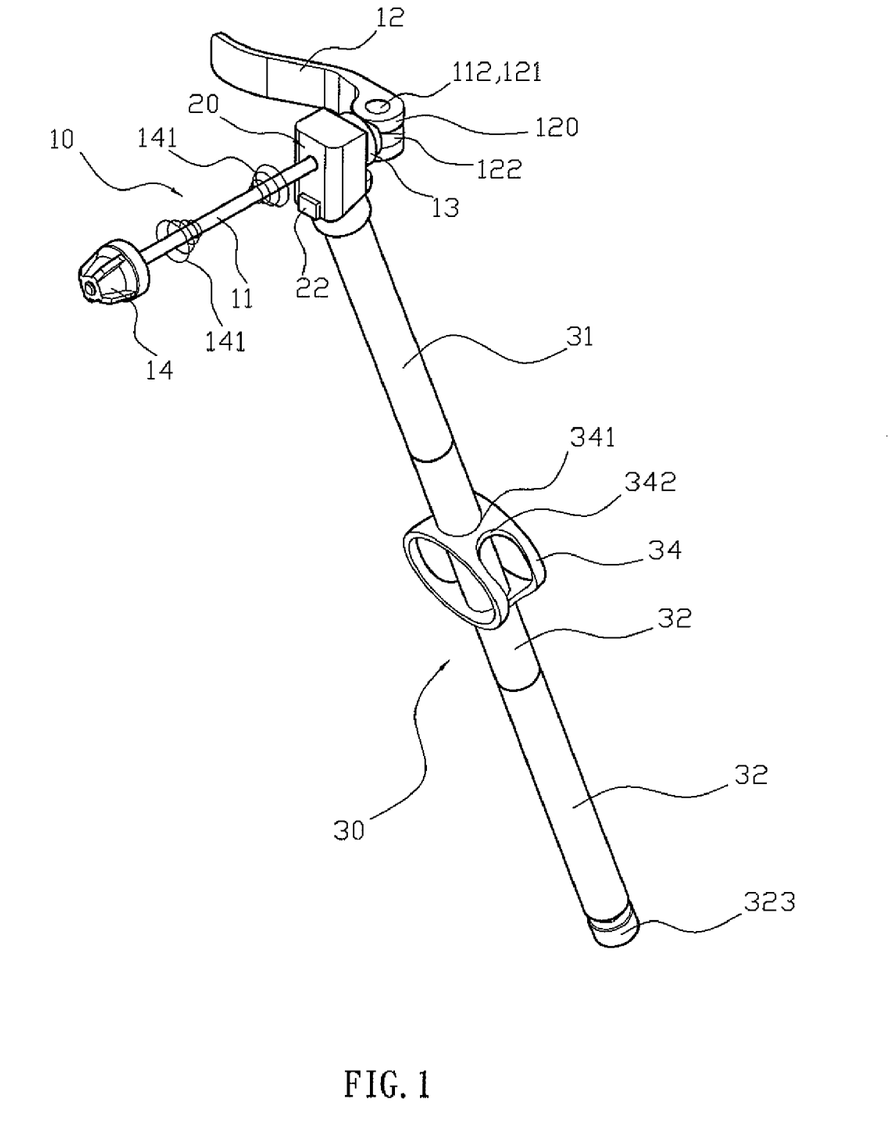
FIG. 1 is a perspective view of a kickstand for a bicycle in accordance with the preferred embodiment of the present invention.
Figure 2:
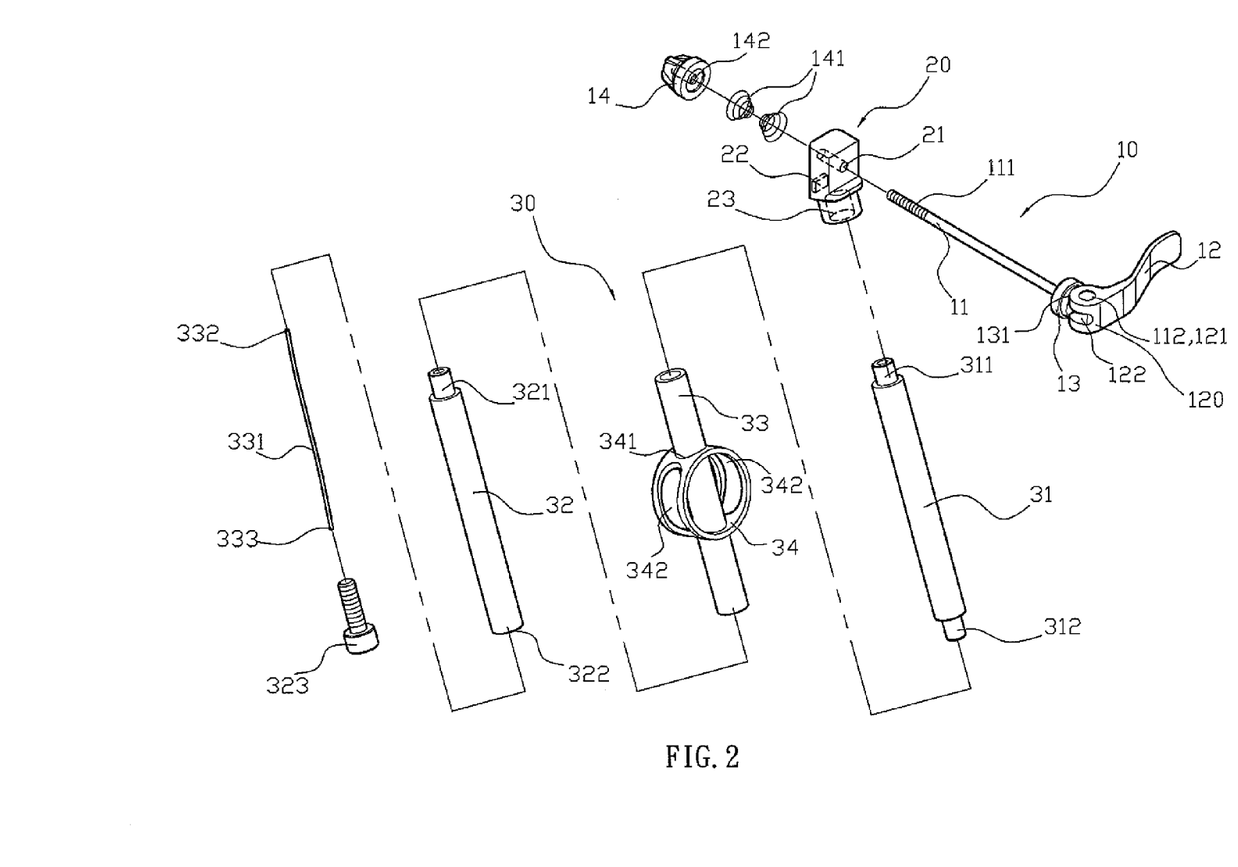
FIG. 2 is an exploded perspective view of the kickstand for a bicycle as shown in FIG. 1.
Figure 3:
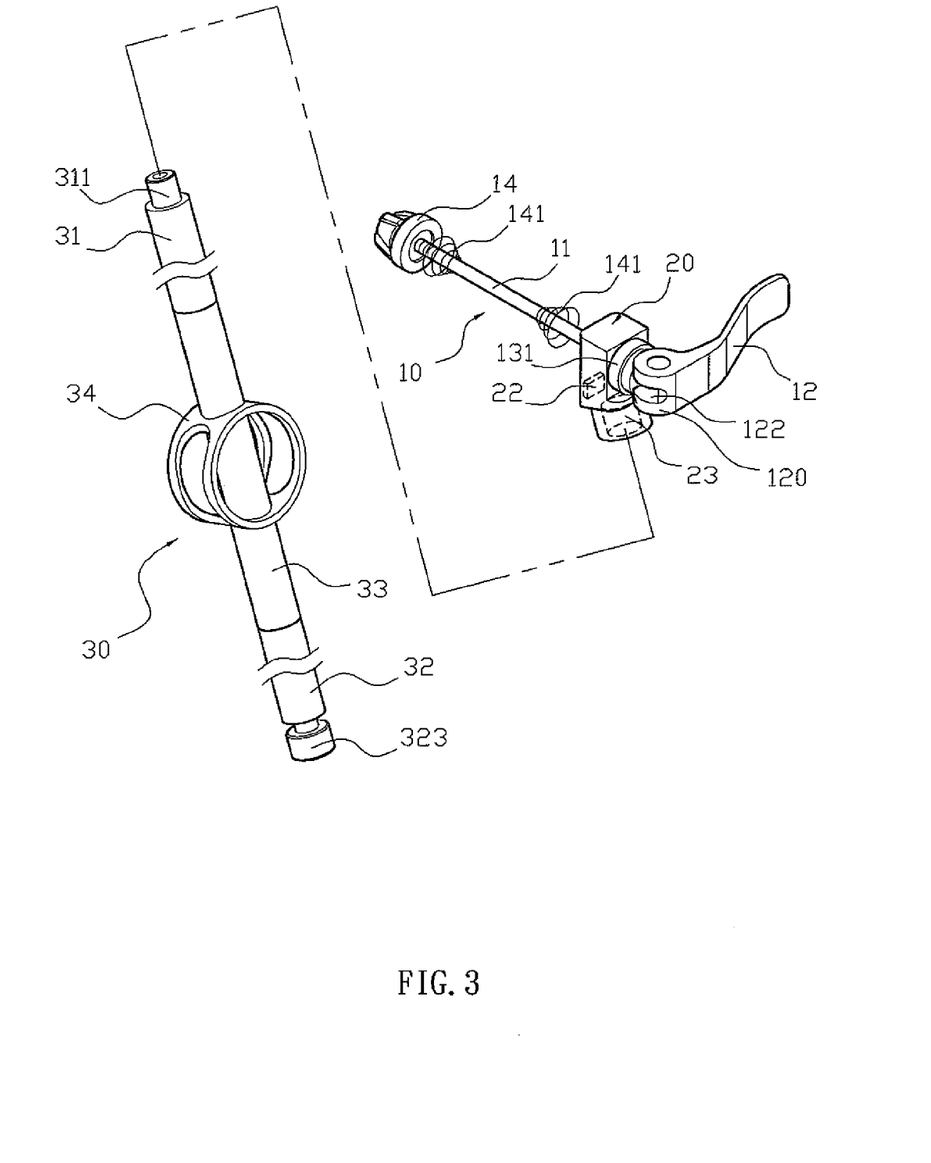
FIG. 3 is a partially exploded perspective view of the kickstand for a bicycle as shown in FIG. 1.
Figure 4:
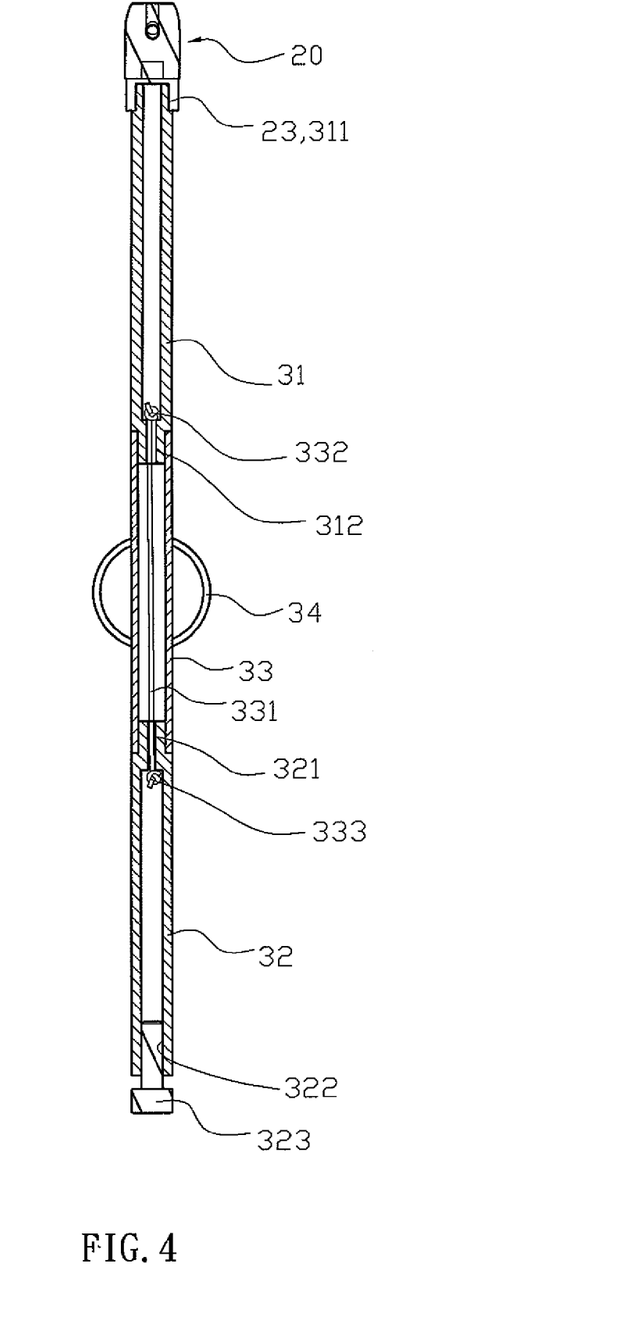
FIG. 4 is a front cross-sectional view of the kickstand for a bicycle as shown in FIG. 1.
Figure 5:
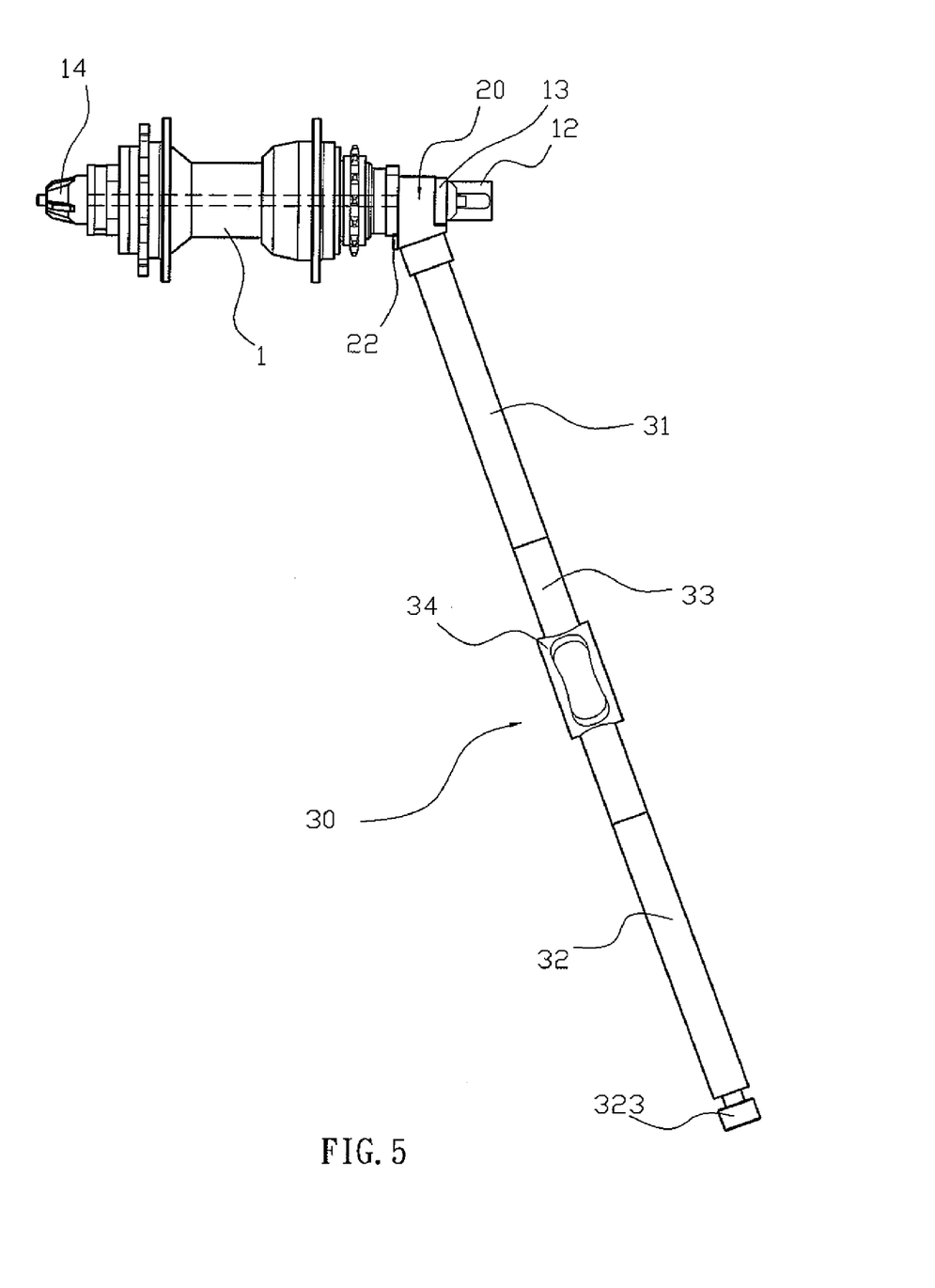
FIG. 5 is a side view showing the kickstand being mounted on a rear wheel axle of the bicycle.
Figure 6:
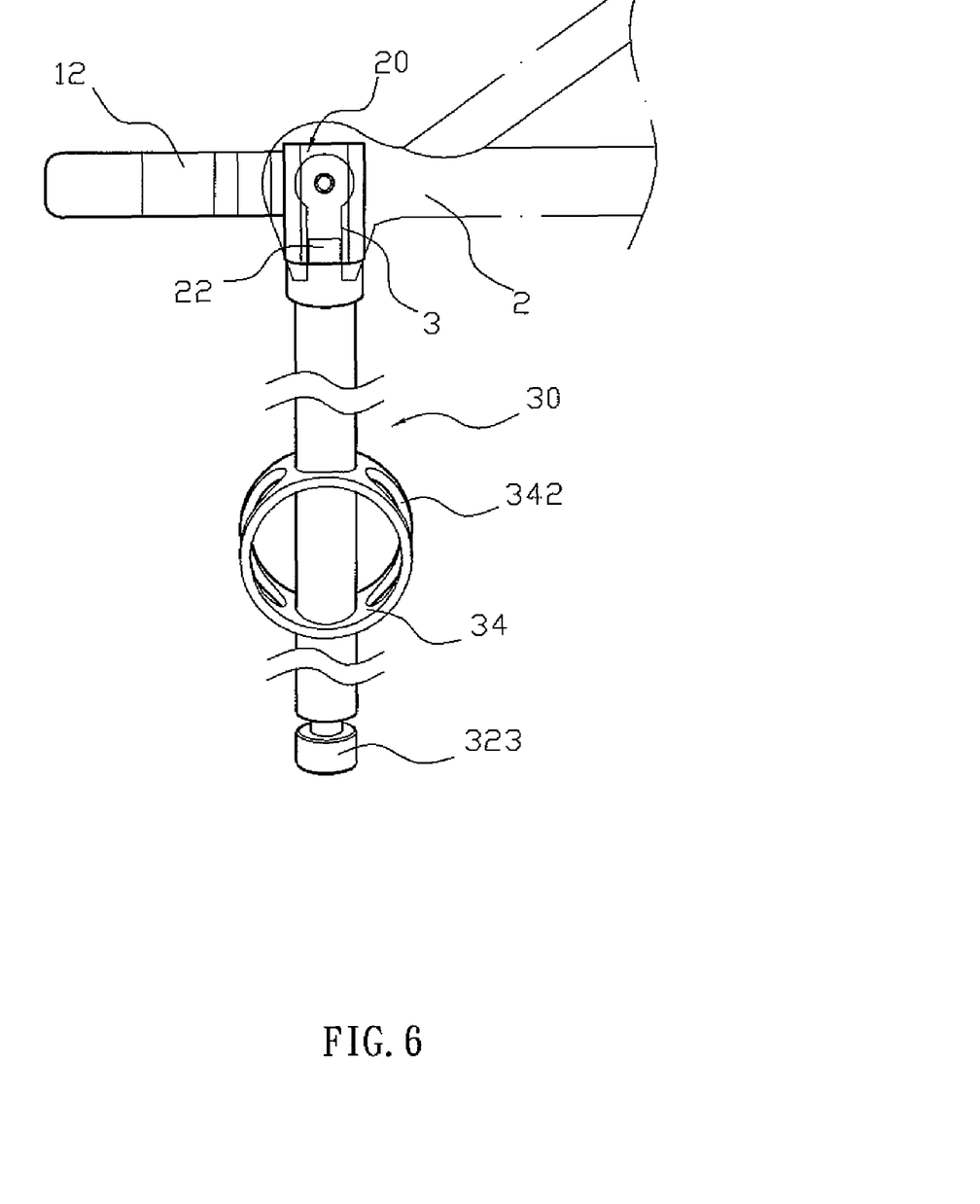
FIG. 6 is a front view showing the kickstand being mounted on a chain stay of the bicycle.

In assembly, referring to FIGS. 5 and 6 with reference to FIGS. 1-4, the shaft 11 of the quick release device 10 extends through a rear wheel axle (or rear hub) 1 of the bicycle until the connector 20 abuts a first end of the rear wheel axle 1 as shown in FIG. 5. Then, the fixing member 14 of the quick release device 10 is screwed onto the outer threaded section 111 of the shaft 11 and abuts a second end of the rear wheel axle 1. Then, the control handle 12 of the quick release device 10 is pivoted on the support rod 112 of the shaft 11 eccentrically to push the locking member 13 of the quick release device 10 and the connector 20 toward the fixing member 14 of the quick release device 10 to clamp the rear wheel axle 1 between the fixing member 14 of the quick release device 10 and the connector 20 so as to attach the support stand 30 to the rear wheel axle 1. At this time, the limit block 22 of the connector 20 is inserted into an opening 3 of a chain stay 2 of the bicycle as shown in FIG. 6 so that the connector 20 is secured on the chain stay 2 exactly.

Figure 7:
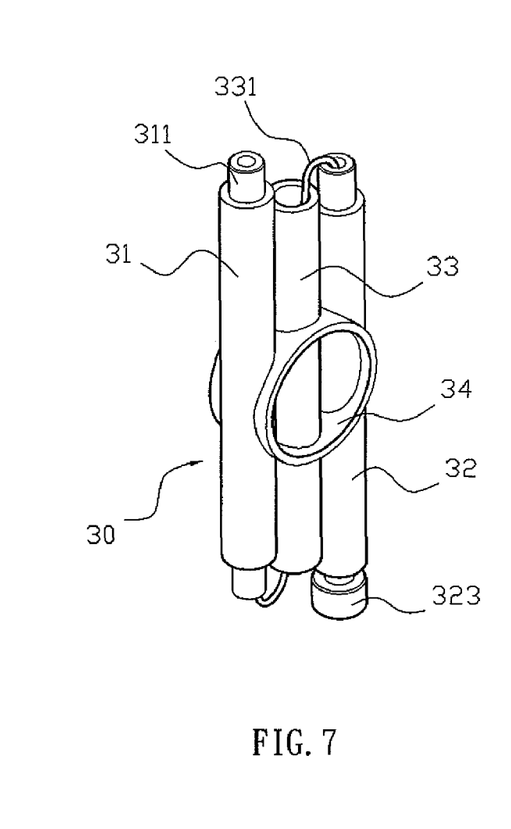
FIG. 7 is a perspective folded view of a support stand of the kickstand for a bicycle as shown in FIG. 1.
Figures 8, 9:
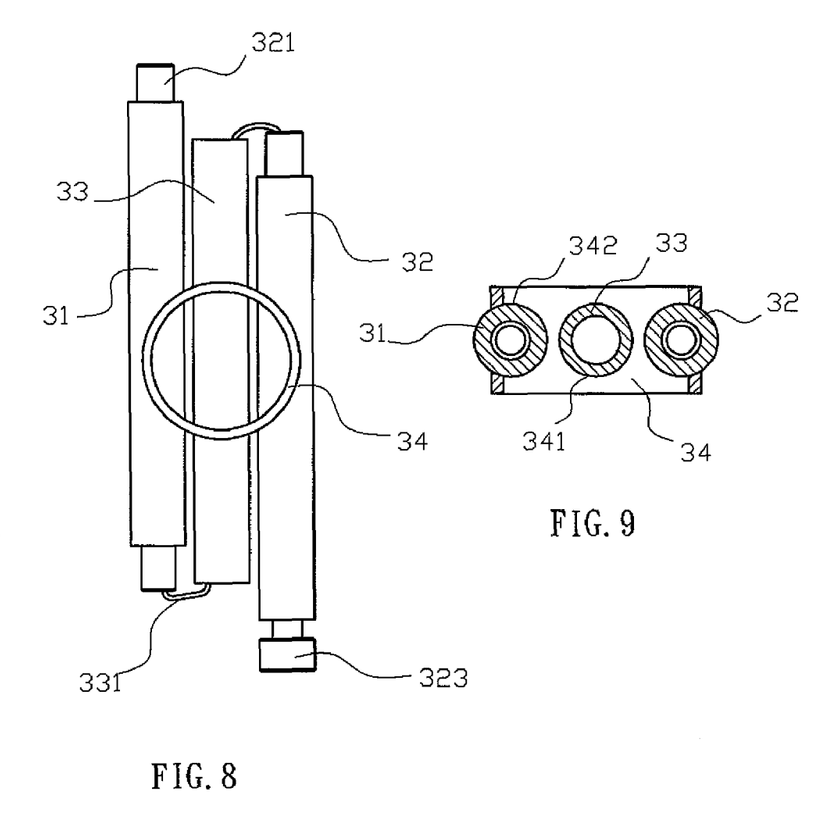
FIG. 8 is a front view of the support stand of the kickstand for a bicycle as shown in FIG. 7.
FIG. 9 is a top cross-sectional view of the support stand of the kickstand for a bicycle as shown in FIG. 7.

As shown in FIGS. 7-9, when the upper leg 31 and the lower leg 32 of the support stand 30 are detached from the middle leg 33 of the support stand 30, the upper leg 31 and the lower leg 32 are received in the two receiving slots 342 of the receiving member 34 so that the upper leg 31 and the lower leg 32 are juxtaposed to the middle leg 33, and the support stand 30 is foldable when not in use so as to reduce the whole volume of the bicycle. At this time, the elastic cord 331 is mounted in the middle leg 33 and has a first end 332 secured to the lower end of the upper leg 31 and a second end 333 secured to the upper end of the lower leg 32 so that the upper leg 31, the lower leg 32 and the middle leg 33 are connected by the elastic cord 331 without detachment.

Accordingly, the kickstand is mounted on and detached from the rear wheel axle 1 of the bicycle easily and quickly by locking and unlocking the quick release device 10, thereby facilitating a user mounting and detaching the kickstand. In addition, the limit block 22 of the connector 20 is inserted into and locked in the opening 3 of the chain stay 2 of the bicycle so that the kickstand is locked on the chain stay 2 exactly and stably. Further, when the upper leg 31 and the lower leg 32 of the support stand 30 are detached from the middle leg 33 of the support stand 30, the upper leg 31 and the lower leg 32 are received in the two receiving slots 342 of the receiving member 34 so that the upper leg 31 and the lower leg 32 are juxtaposed to the middle leg 33, and the support stand 30 is foldable when not in use so as to reduce the whole volume of the bicycle. Further, the support stand 30 is detachable from the connector 20 when not in use so as to reduce the whole weight of the bicycle and to prevent the support stand 30 from protruding outwardly from the bicycle.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A kickstand for a bicycle, comprising:
   a support stand;
   a connector detachably mounted on an upper portion of the support stand;
   a quick release device releasably mounted on the connector;
   wherein the support stand includes:
   an upper leg having an upper end detachably mounted on the connector;
   a middle leg having an upper end detachably mounted on a lower end of the upper leg;
   a lower leg having an upper end detachably mounted on a lower end of the middle leg;
   a receiving member mounted on the middle leg;
   the connector has a lower portion provided with a mounting hole mounted on the upper portion of the support stand;
   the upper end of the upper leg is provided with a reduced mounting post inserted into and detachably mounted in the mounting hole of the connector.

2. The kickstand for a bicycle in accordance with claim 1, wherein the quick release device includes:
   a shaft extending through the connector;
   a control handle pivotally mounted on a first end of the shaft;
   a fixing member detachably mounted on a second end of the shaft;
   a locking member mounted on the shaft and located between the connector and the control handle.

3. The kickstand for a bicycle in accordance with claim 2, wherein the connector has a first side facing the control handle of the quick release device and a second side provided with a protruding limit block facing the fixing member of the quick release device.

4. The kickstand for a bicycle in accordance with claim 2, wherein the connector has an upper portion provided with a shaft hole to allow passage of the shaft of the quick release device.

5. The kickstand for a bicycle in accordance with claim 2, wherein the connector is located between the control handle and the fixing member of the quick release device.

6. The kickstand for a bicycle in accordance with claim 2, wherein the quick release device further includes:
   two elastic members mounted on the shaft and located between the connector and the fixing member.

7. The kickstand for a bicycle in accordance with claim 2, wherein
   the shaft of the quick release device is movably mounted on the connector;
   the first end of the shaft is provided with a support rod;
   the second end of the shaft is provided with an outer threaded section;
   the locking member of the quick release device is movably mounted on the shaft and has a side provided with an abutting face facing and abutting the control handle;
   the control handle of the quick release device has an end provided with an enlarged pivot portion mounted on the support rod of the shaft pivotally and eccentrically;
   the pivot portion of the control handle abuts the abutting face of the locking member and is provided with an eccentric pivot hole pivotally mounted on the support rod of the shaft;
   the pivot portion of the control handle has a periphery provided with slit to allow passage of the first end of the shaft during rotation of the control handle relative to the support rod of the shaft;
   the pivot portion of the control handle is rotatable relative to the support rod of the shaft eccentrically to push the locking member toward the connector;
   the fixing member of the quick release device is provided with a screw bore screwed onto the outer threaded section of the shaft.

8. The kickstand for a bicycle in accordance with claim 1, wherein the support stand further includes:
   an elastic cord mounted in the middle leg and having a first end secured to the lower end of the upper leg and a second end secured to the upper end of the lower leg.

9. The kickstand for a bicycle in accordance with claim 1, wherein the receiving member of the support stand is a ring-shaped body.

10. The kickstand for a bicycle in accordance with claim 1, wherein the receiving member of the support stand is mounted on a middle portion of the middle leg and is provided with a mounting hole mounted on the middle leg.

11. The kickstand for a bicycle in accordance with claim 1, wherein
   the lower end of the upper leg is provided with a reduced mounting post inserted into and detachably mounted in the upper end of the middle leg;
   the upper end of the lower leg is provided with a reduced mounting post inserted into and detachably mounted in the lower end of the middle leg.

12. The kickstand for a bicycle in accordance with claim 1, wherein
   the upper leg of the support stand is a hollow tube;
   the lower leg of the support stand is a hollow tube;
   the middle leg of the support stand is a hollow tube.

13. The kickstand for a bicycle in accordance with claim 1, wherein the support stand further includes:
   a height adjusting member mounted on a lower end of the lower leg.

14. The kickstand for a bicycle in accordance with claim 13, wherein
   the lower end of the lower leg is provided with an inner threaded section;
   the height adjusting member of the support stand is a bolt that is screwed into the inner threaded section of the lower leg.

15. A kickstand for a bicycle, comprising:
   a support stand;
   a connector detachably mounted on an upper portion of the support stand;
   a quick release device releasably mounted on the connector;
   wherein the support stand includes:
   an upper leg having an upper end detachably mounted on the connector;
   a middle leg having an upper end detachably mounted on a lower end of the upper leg;
   a lower leg having an upper end detachably mounted on a lower end of the middle leg;
   a receiving member mounted on the middle leg;
   the receiving member of the support stand has a periphery provided with two radially opposite receiving slots to receive the upper leg and the lower leg when the upper leg and the lower leg are detachable from the middle leg.

16. The kickstand for a bicycle in accordance with claim 15, wherein the upper leg and the lower leg are juxtaposed to the middle leg when the upper leg and the lower leg are received in the two receiving slots of the receiving member.

17. The kickstand for a bicycle in accordance with claim 15, wherein each of the two receiving slots of the receiving member is substantially arc-shaped.

18. The kickstand for a bicycle in accordance with claim 15, wherein the middle leg of the support stand is located between the two receiving slots of the receiving member.

* * * * *